No. 820,910. PATENTED MAY 15, 1906.
J. G. CALLAN & F. R. C. BOYD.
SPEED GOVERNOR FOR ELASTIC FLUID TURBINES.
APPLICATION FILED MAR. 12, 1904.

5 SHEETS—SHEET 1.

Witnesses:
Marcus L. Byng.
Alex F. Macdonald.

Inventors,
John G. Callan,
Frederic R. C. Boyd,
By Albert G. Davis
att'y.

No. 820,910. PATENTED MAY 15, 1906.
J. G. CALLAN & F. R. C. BOYD.
SPEED GOVERNOR FOR ELASTIC FLUID TURBINES.
APPLICATION FILED MAR. 12, 1904.

5 SHEETS—SHEET 2.

Witnesses:
Marcus L. Byng.
Alex F. Macdonald.

Inventors,
John G. Callan,
Frederic R. C. Boyd,
By Albert G. Davis
Att'y.

No. 820,910. PATENTED MAY 15, 1906.
J. G. CALLAN & F. R. C. BOYD.
SPEED GOVERNOR FOR ELASTIC FLUID TURBINES.
APPLICATION FILED MAR. 12, 1904.
5 SHEETS—SHEET 3.
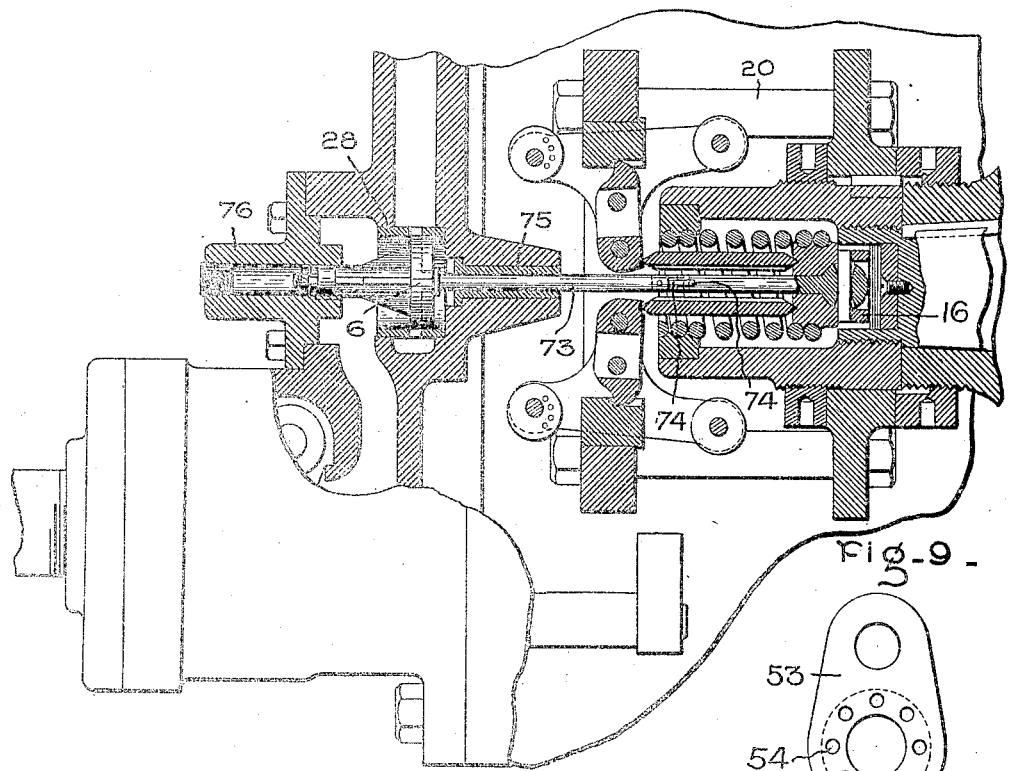
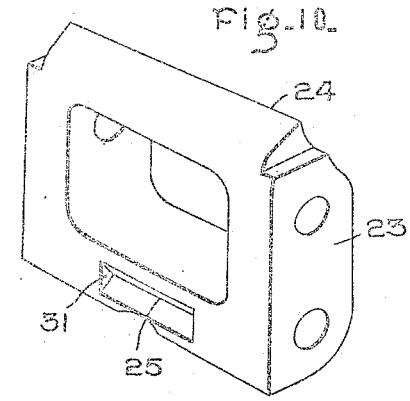
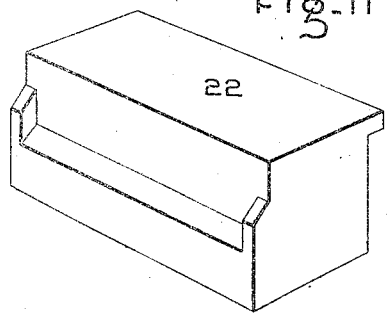
Witnesses:
Marcus L. Byng
Alex. F. Macdonald
Inventors,
John G. Callan,
Frederic R. C. Boyd
By Albt. H. Davis
Att'y.

No. 820,910. PATENTED MAY 15, 1906.
J. G. CALLAN & F. R. C. BOYD.
SPEED GOVERNOR FOR ELASTIC FLUID TURBINES.
APPLICATION FILED MAR. 12, 1904.
5 SHEETS—SHEET 4.
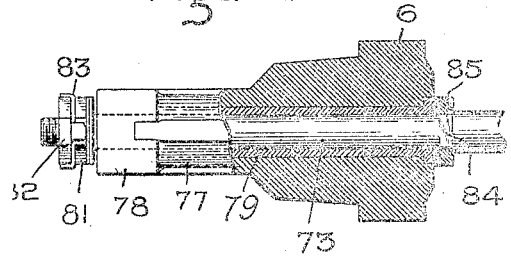
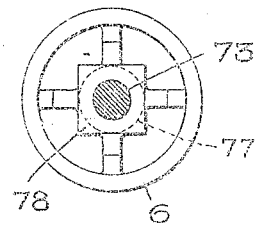
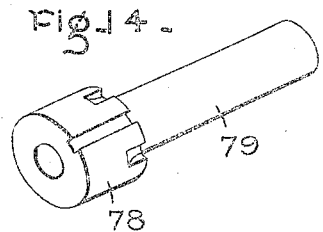
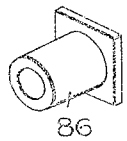
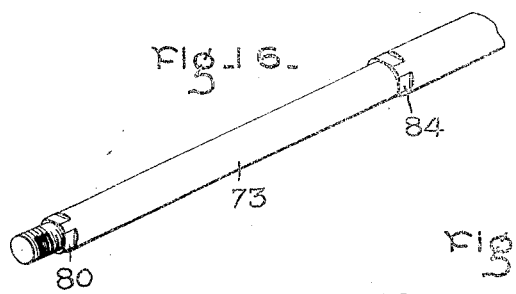
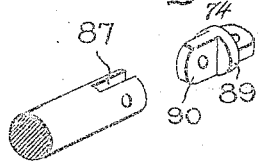
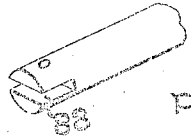
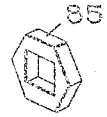
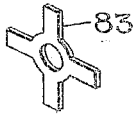
Witnesses:
Marcus L. Byng.
Alex F. Macdonald.
Inventors,
John G. Callan,
Frederic R. C. Boyd,
By Albert G. Davis
Att'y.

No. 820,910. PATENTED MAY 15, 1906.
J. G. CALLAN & F. R. C. BOYD.
SPEED GOVERNOR FOR ELASTIC FLUID TURBINES.
APPLICATION FILED MAR. 12, 1904.
5 SHEETS—SHEET 5.
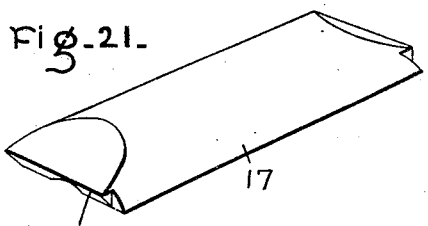
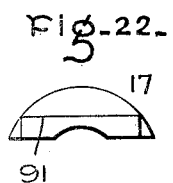
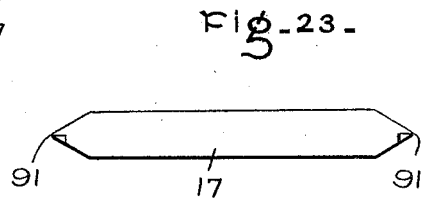
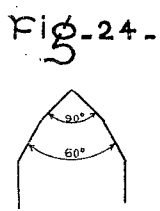
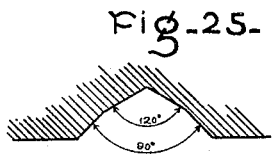
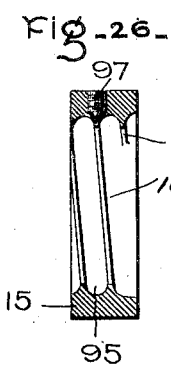
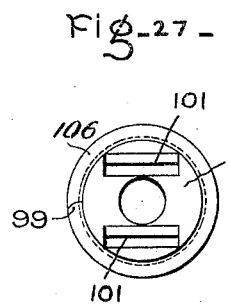
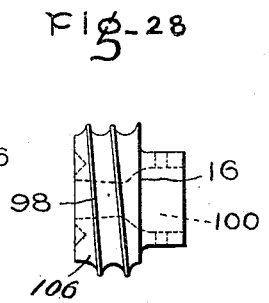
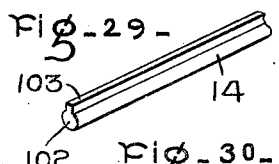
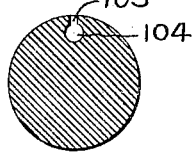
Witnesses:
Marcus L. Byng.
Alex. F. Macdonald.
Inventors
John G. Callan,
Frederic R. C. Boyd,
By Albert G. Davis
Att'y.

UNITED STATES PATENT OFFICE.

JOHN G. CALLAN AND FREDERIC R. C. BOYD, OF LYNN, MASSACHUSETTS, ASSIGNORS TO GENERAL ELECTRIC COMPANY, A CORPORATION OF NEW YORK.

SPEED-GOVERNOR FOR ELASTIC-FLUID TURBINES.

No. 820,910.　　　Specification of Letters Patent.　　　Patented May 15, 1906.

Application filed March 12, 1904. Serial No. 197,788.

*To all whom it may concern:*

Be it known that we, JOHN G. CALLAN and FREDERIC R. C. BOYD, citizens of the United States, residing at Lynn, county of Essex, State of Massachusetts, have invented certain new and useful Improvements in Speed-Governors for Elastic-Fluid Turbines, of which the following is a specification.

The present invention relates to centrifugal governors, and especially to those employed for high-speed work, such as elastic-fluid turbines, for example.

It has for its object to provide a self-contained governor which is capable of being accurately and easily adjusted when in position on the machine and one in which internal friction is reduced to a point where it can be disregarded.

A further object of the invention is to provide a centrifugal speed-governor and an emergency device or governor which are so combined and arranged that they can be mounted on or taken off of the shaft or rotary support as a unit and which are capable of acting successively.

Figure 1:
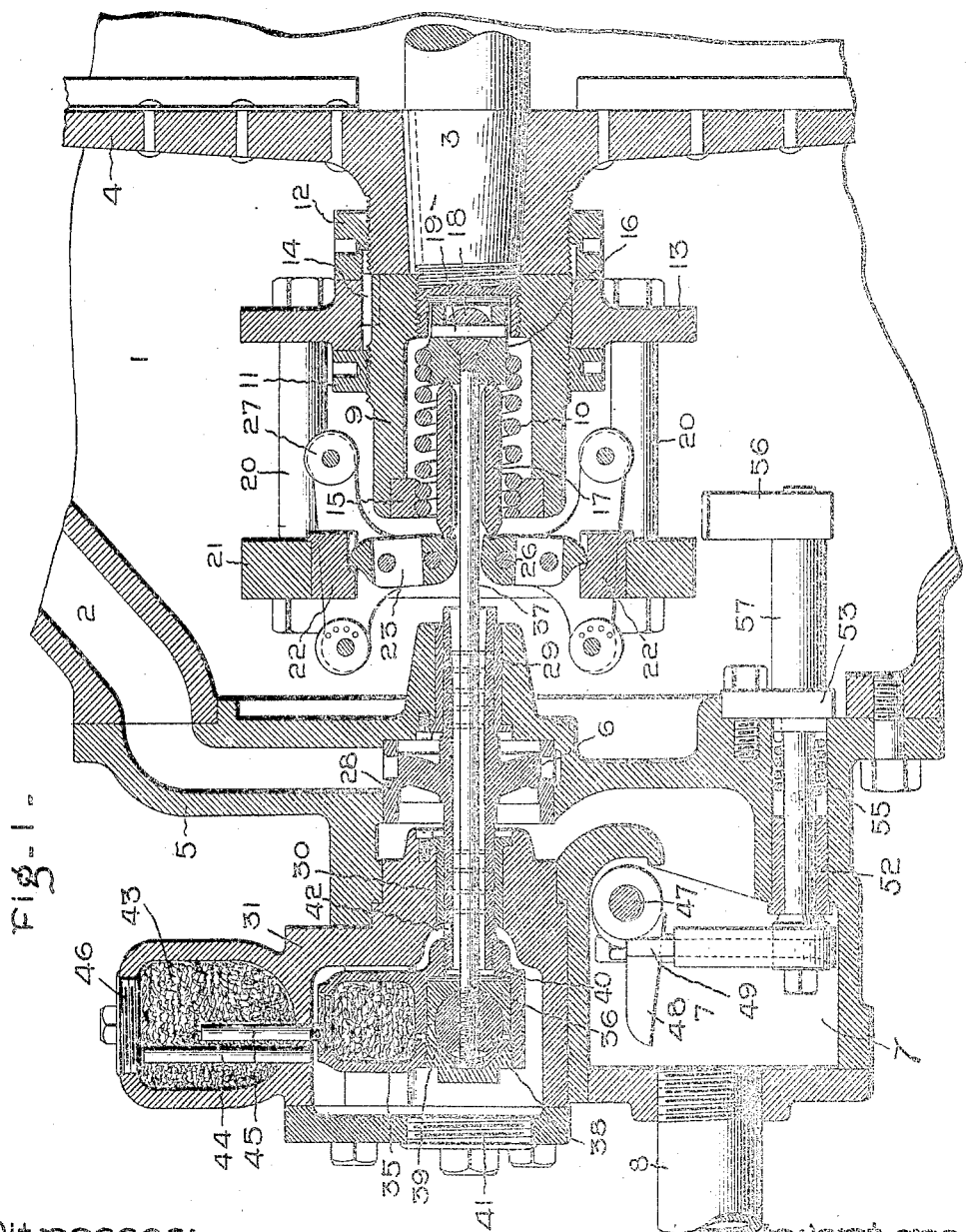
Figure 2:
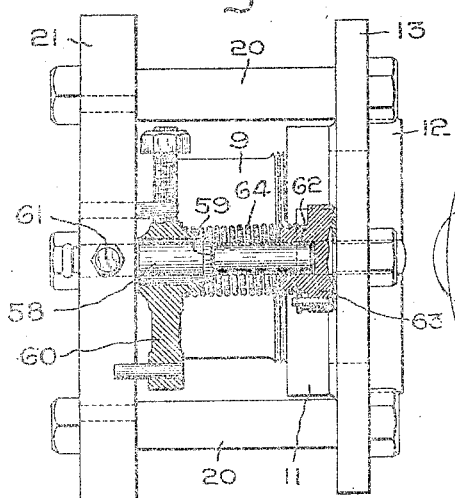
Figure 3:
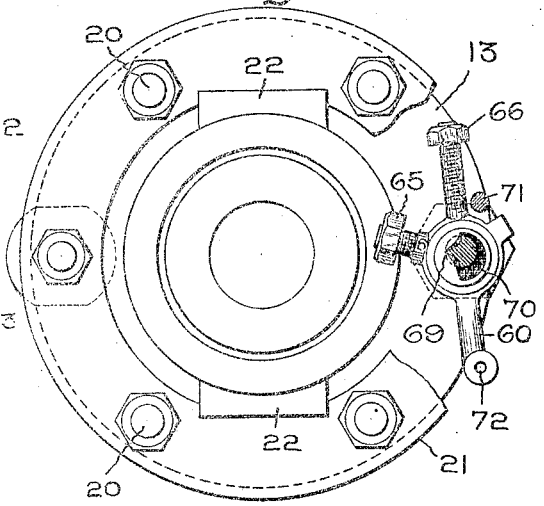
Figure 4:
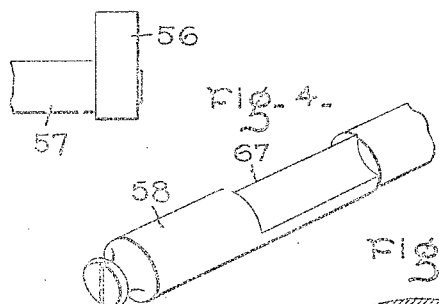
Figure 5:
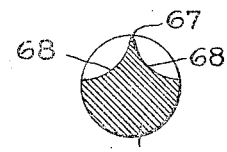
Figure 6:
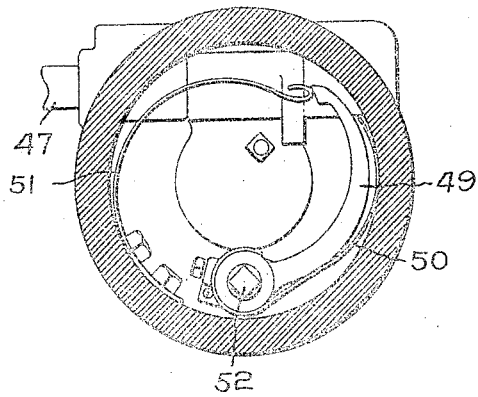
Figure 7:
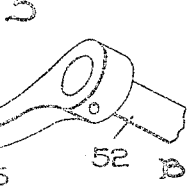

In the accompanying drawings, which illustrate one embodiment of our invention, Figure 1 is a partial longitudinal section of a horizontal elastic-fluid tubine of the jet type. Fig. 2 is a detail view, partially in section, showing the arrangement of the emergency-governor. Fig. 3 is an end view, partially broken away, of the emergency-governor. Fig. 4 is a perspective view of the knife-edge employed for supporting the emergency-governor weight. Fig. 5 is a cross-sectional view of the same. Fig. 6 is a sectional view showing the emergency-valve in its closed position. Fig. 7 is a perspective view of the emergency-valve actuator. Fig. 8 is a longitudinal sectional view of a part of the turbine-casing, showing a slight modification in the construction of the governing-valve and its actuating-stem. Fig. 9 is a detail view showing the means employed for adjusting the tension on the tripping device of the emergency valve. Fig. 10 is a perspective view of the knife-edges for supporting the centrifugal weights. Fig. 11 is a perspective view of the block upon which the knife-edge is seated. Fig. 12 is a sectional view of the rotating piston-valve for controlling the admission of steam. Fig. 13 is an end view of the same. Fig. 14 is a perspective view of a part of the guide for the valve. Fig. 15 is a perspective view of a part of the sleeve which surrounds the valve-stem. Fig. 16 is a perspective view of the outer end of the valve-stem. Fig. 17 is a perspective view showing the parts of the universal coupling located between the valve-stem and the movable abutment of the governor. Figs. 18, 19, and 20 show means for preventing the valve and other parts from turning on the valve-stem. Figs. 21 to 23, inclusive, are detail views showing the construction of the knife-edge struts or members which extend between the weight and the movable abutment of the governor. Figs. 24 and 25 are enlarged views showing the proper angles for the ends of the struts and their seats. Figs. 26, 27, and 28 show the nuts employed for supporting the ends of the governor-spring. Fig. 29 is a perspective view of the key for securing certain of the parts in place; and Fig. 30 is a cross-sectional view of a shaft, showing the shape of the seat.

Referring to Fig. 1, 1 represents the casing of the turbine, which is provided with a steam or other fluid-carrying passage 2, formed therein. Mounted in suitable bearing or bearings (not shown) is a shaft 3, which carries a bracket-wheel 4 of any desired construction. One end of the casing is closed in by a removable head 5, which contains a fluid-carrying passage that registers with the passage 2 in the main casing. The entrance of fluid into this passage is governed by means of a reciprocating piston-valve 6. Steam is admitted to the turbine from the chamber 7, which in turn is supplied by the pipe 8. The end of the wheel-shaft is provided with a screw-thread, and mounted thereon and engaging with the hub of the wheel is a cylindrical support 9, which incloses the coiled extension-spring 10 of the governor that opposes the action of the weights. This support, in addition to carrying one end of the spring, holds the bucket-wheel against axial movement. It is important to employ extension as contrasted to compression springs, since it is almost impossible to make compression springs that can be compressed evenly at every point, and if the compression is not even it will throw one or more of the parts out of line and cause friction and unbalancing. The periphery of the support is screw-threaded for a portion of its length to receive the adjusting-nut 11. The hub of the wheel is also threaded to receive the adjusting-nut 12. That portion of the support between the adjusting-nut 11 and the hub of the wheel is turned off true to receive the ring 13, which acts as a support for the weights. As the flanged ring is moved axially in one direction or the other by means of the nuts the tension on the spring can be adjusted. The ring is prevented from turning by means of a key or feather 14, which will be described in connection with Figs. 29 and 30. The outer end of the cylindrical support is shouldered to receive the nut 15, which surrounds the end of the extension-spring 10 and acts as a support therefor. The opposite end of the spring is attached to a movable abutment 16, that also acts as a nut for the spring and which contains seats for the knife-edges on the struts 17. By rotating either or both of these nuts the scale of the spring can be changed by varying the number of active turns or portions thereof. One of these nuts acts internally on the spring and the other externally. This arrangement is advantageous, in that it furnishes ample room for the piston-valve actuator and the struts 17. The inner end of the nut 16 projects into the tubular end of the wheel-shaft and is cut out to receive the ball 18, that is attached to the stem or actuator of the piston-valve. Between the end of the abutment and the socket in the shaft are or may be secured shims to limit the inward movement. The ball is retained in place by the pin 19, and sufficient space is left between the ends of the opening in the ball and the pin to permit the inner end of the spring to revolve about its own center of gravity. Attached to the flanged ring are two or more posts 20, which support the ring 21. The rings 13 and 21 and the posts 20 constitute a supporting-frame, which, together with the support 9, carry all the operating parts of the speed-responsive device, and they form a unitary structure which can be assembled on or removed from the shaft 3 simply by screwing or unscrewing it. This simplifies the construction and the parts can be readily assembled on the shop-bench and then applied to the shaft. In the present instance four of these posts are provided. At diametrically opposite points the ring is cut away slightly to receive the hardened-steel blocks 22, which receive one of the knife-edges formed on the frame-blocks 23. The frame-blocks are best shown in Fig. 10, wherein 24 represents the knife-edge which engages with a seat on the block 22, and 25 the seat to receive the knife-edge on the strut or compression member 17. These edges and seats may have the same shape, as will be hereinafter referred to in connection with Figs. 24, 25. The frame is cut out in the center so as to decrease the effect due to centrifugal action as much as possible, and by having the knife-edge and seat on the same piece there is no chance for them to get out of alinement. It is to be noted that the ends of the seat 25 terminate in walls 31, which prevent the struts or compression members 17 from moving laterally except by a very small amount. Since these walls are located at the center of movement of the knife-edge and only one can be in engagement therewith at a time, the effect due to friction can be disregarded. The frame is cut away just below the seat to give plenty of room for the valve-actuator. The frame is secured to the weight-arms by screws or bolts 26. Each weight-arm comprises a pair of T-shaped plates which are provided with weights or masses of metal 27 at their outer and inner ends measured in an axial plane, and as the speed increases the weights on the wheel side of the knife-edges tend to move inward and those on the opposite ends to move outward. One or both of the weights on the arm may be adjustably mounted, so that the center of the mass can be moved toward or away from the shaft axis. In the present instance a pin for attaching the weight is located eccentrically with respect to the center of the mass. A second pin serves to hold the weight in any given position with respect to the first.

Mounted in the head 5 is a removable sleeve 28, that is provided with one or more ports for admitting steam to the passage 2 in the wheel-casing. The piston-valve 6 is provided with an elongated tubular stem extending in opposite directions therefrom. Both portions of the stem have grooves which act as water-packings to prevent the escape of steam. The inner end of the stem is surrounded by a detachable sleeve 29, that is attached to the head. The outer portion of the stem enters a detachable sleeve 30, that is held in place by a screw which enters the detachable casing 31, which contains the devices for lubricating the bearing between the valve and its actuator. Secured to the left-hand end of the cylindrical extension of the piston-valve is a screw-threaded box or head 35, which contains two compartments—one for receiving the spherical bearing-blocks 36, which surround the ball on the end of the valve-actuator 37, and the other for receiving a body of absorbent material containing oil. The outer end of the rod 37 is screw-threaded, and the ball 38 is mounted thereon and held in place by a set-screw. The balls or spheres on the opposite ends of the actuator constitute a universal joint to prevent cramping of the parts. The outer bearing-block is screw-threaded and contains an oil-passage 39, leading from the waste-containing compartment of the box to a small receptacle containing a body of felt or other similar material adjacent to the screw in the ball for lubricating the bearing-surfaces. The inner bearing-block makes a close fit with the box, and between it and the box are shims 40, by means of which the position of the valve can be adjusted axially. The box is loosely mounted in the chamber formed in the fixed casing 31, and the side walls of the chamber approach the box sufficiently close to prevent it from rotating. The casing is provided with a detachable cover, and mounted in the cover at a point in line with the spindle 37 is a screw-threaded plug 41. By removing this plug the bearing for the outer end of the spindle 37 can be adjusted or removed, and by removing the cover-plate, ball, and casing 31 the valve can be removed and a new one substituted.

To equalize the pressures between the wheel-chamber and the chamber in the casing 31, to balance the valve, and also to permit the lubricant to freely flow to the spherical bearing, an opening 42 is provided in the left-hand end of the extension on the valve, which opening communicates with the center bore. Formed on the casing above the bearing 31 and its oil-chamber is an oil chamber or receiver 43, containing a body of waste or similar material. Mounted within the receiver are tubes 44 and 45, the former being employed to equalize the pressures between the receiver and the chamber below it and the latter to convey oil from one compartment to the other. The upper end of the oil-chamber is closed in by means of a removable screw-threaded plug 46. Owing to the fact that the wheel-chamber normally operates at atmospheric pressure, it is possible to supply lubricant to the chamber 43 when the turbine is in operation.

It is to be noted that the governor, the valve, and the actuating parts are entirely inclosed, so that they are protected from injury and dust and dirt. This is particularly important where the turbine is to be used in connection with headlight sets for locomotives.

It is to be noted that the spring is of the extension type, which is especially advantageous for high-speed governors, since they can be made to expand and contract more evenly than compression-springs, and the force exerted by them can be more effectively utilized. By locating the movable abutment at the inner instead of the outer end of the spring the dimension of the governor in an axial direction is reduced to a minimum, which is very important, particularly in small units.

It is also to be noted that the piston-valve actuator 37 is long, so that the motion of the sphere or ball 38 is negligible for a considerable motion of the sphere or ball 18 in case the center of rotation of the abutment does not coincide with the axis of the shaft. This arrangement is also advantageous, in that it eliminates side strains or thrusts on the guides for the piston-valve. The piston-valve being located between the ends of the actuator instead of at one end, the length of the casing measured on an axial plane is greatly reduced and at the same time ample room is provided for all of the parts. This arrangement also permits the use of long and well-packed guides for the valve.

Thus far the description has been directed to the speed-responsive device, which is arranged to keep the speed of the turbine constant or practically so under load changes. In case anything happens to the governor it is necessary to provide means responsive to abnormal speed conditions for stopping the turbine, and the control of this emergency device should be under one or more centrifugal weights, which are independent of the weights which govern the movement of the controlling valve or valves, so that if anything happens to the latter there is nothing to prevent the emergency device from operating. In order that the governors shall occupy a minimum amount of space and be capable of being adjusted and tested separately from the turbine, it is important to combine them in such a manner that one support is sufficient.

We will now proceed to describe a construction which will fulfil the conditions specified.

Between the piston-controlling valve 6 and the inlet-chamber 7 is a fluid-carrying passage which terminates in a valve-seat. Situated a short distance above the valve-seat is a spindle 47, on which the emergency-valve 48 of the flap type is mounted. The spindle extends outside of the valve-casing where it is provided with a handle (not shown) for resetting. Between the hub of the valve and the spindle is a sufficient amount of lost motion to insure the seating of the valve at all times. The idea of loosely mounting the valve is also advantageous, in that it eliminates the chance for error in workmanship, which might prevent the valve from properly seating. The valve is normally held open by a latch 49, which is continually urged toward it by a coil-spring 55. The valve itself also has a tendency to close, due to gravity and the flat spring 51, Fig. 6. We have found that in actual practice when the latch 49 is actuated by the governor its action is so quick that it is liable to return and catch the valve before it has a chance to close under the pressure of the steam in the chamber 7. To obviate this objection, the spring 51 is arranged to perform a double function: first, to close the valve 48, and, second, to engage the end of the latch, as shown in Fig. 6, the flat spring 50 acting as a buffer. The latch 49 is mounted on the spindle 52, which is supported at one end by a sleeve and at the other end in a gland 53, which contains a number of holes 54, Fig. 9, receiving the end of the coiled spring 55, which continually urges the shaft in a direction to bring the latch under the valve and hold it open. The opposite end of the spring is mounted in the spindle 52. By shifting the end of the spring from one hole in the gland to another its effect can be varied as desired. On the end of the spindle 52 is an actuator 56, Figs. 1 and 7, which is maintained a fixed distance from the gland 53 and the other stationary parts of the turbine by a sleeve or other separator 57. It will be noted that the end of the actuator is curved slightly at the outer end in the direction of rotation, so that the moving part of the emergency-governor will strike a glancing blow, and this without excessive shock.

Referring now to Figs. 2 to 5, inclusive, the construction of the emergency-governor will be described. 9 represents the tubular support which is attached to the end of the main shaft, and 11 12 the adjusting-nuts for changing the position of the ring 13. Secured to the ring are posts 20, which carry the ring 21, that supports the blocks 22, that carry the centrifugal governor-weights. In order to simplify the illustration, the governor-weights have been omitted in these figures. Mounted in openings in the rings 21 and 13 is a two-part hardened-steel spindle 58, which is provided with a removable collar 59, and between the collar and a hard-steel washer is a weight-arm 60. The spindle is prevented from turning by the set-screw 61, and by releasing the set-screw the spindle can be withdrawn through the hole in the ring. The opposite end of the spindle is formed by or is mounted in a sleeve 62, which is carried by the head 63, the latter being secured in place by a screw-threaded stem that is formed integral therewith and passes through the ring 13 and is retained in place by a nut. Between the ring and the head, both of which are knurled, is a copper washer which assists in preventing the parts from turning. The sleeve 62 holds the collar 59 against a shoulder on the spindle 58. To the head 63 is attached one end of the coiled spring 64, the opposite end being attached to the weight-arm. As arranged, the head and weight-arm are capable of relative movement, and the spring opposes the tendency of the emergency-governor to actuate the emergency-valve 48.

The weight-arm 60, as best shown in Fig. 3, is provided with weights 65 and 66, and by changing the position of these weights with respect to the center of motion the speed at which the lever trips the emergency-valve can be adjusted. For example, we have found it satisfactory to have the emergency-governor operate at seven per cent. increase in speed above normal and to reseat itself at twenty-five per cent. under speed. In other words, after the emergency-valve is closed and the speed begins to decrease the governor-lever will assume its normal position after the speed decreases twenty-five per cent. or thereabout. Preferably the coil-spring 64 is rather weak, but is given a fairly high initial tension. The spindle 58 is provided with a knife-edge 67, having concave walls 68, the object of this construction being to give a maximum amount of movement with a minimum weakening of the spindle size. The knife-edge engages with a seat 69 on the weight-arm, which is provided with convex walls 70. By experiment we have found that where the walls of the seat are convex the parts tend to maintain their position at all times and if by accident they are displaced will return immediately. If the walls of the knife-edge were straight and the walls of the seat curved, only a very limited motion could be obtained, and for this reason the walls of the knife-edge are curved on the same, or substantially the same, radius as the walls of the seat; but the arc covered thereby in cross-section is somewhat less than the arc covered by the seat. The weight-arm is arranged to work between two stops 71 and 72, the former being carried by the ring 21 and the latter by the weight-arm. We have found that the stop 72 must be on the outer or active end of the arm to prevent the knife-edge from being moved out of its seat. The center of gravity of the weight-arm is between the axis of rotation and the knife-edge and nearly in line with the knife-edge, so as to give an initially small moment-arm. Diametrically opposite the emergency-governor and carried by the ring 21 is a counterweight which balances the weight of the governor.

Referring to Fig. 8, a somewhat different arrangement of the governing-piston valve 6 is shown. 28 represents a ported sleeve which is mounted in the head 5 of the turbine-casing. Attached to the valve is a spindle 73, which connects it with the movable abutment 16 of the governor. The spindle or stem is divided into two parts, and between the parts is a universal coupling 74, which will be described hereinafter. The end of the spindle adjacent the weights is mounted in a long bearing-sleeve 75, which acts as a guide and also as a packing. The outer ends of the valve and stem are guided by the walls of an opening formed in the detachable cover 76. The outer end of this opening is closed by a screw-threaded plug.

Referring to Figs. 12 to 20, the construction and arrangement of the valve and stem will be described. The valve 6 is made with a piston-like head and an extension 77, which engages with the cylindrical head 78, formed on the sleeve 79, the latter surrounding the spindle 73. The outer end of the spindle is squared at 80, as shown in Fig. 16, for receiving the washer 81, Fig. 19, which is provided with a correspondingly-squared opening.

The end of the spindle is screw-threaded to receive a nut 82, and the latter is prevented from rotating by the nut-lock 83. (Shown in Fig. 20.) Two of the arms are bent backward to engage with the washer 81 and two bent forward to engage with the nut, and thereby relative movement of the two is prevented. The inner end of the spindle 73 is somewhat larger than the outer end, and between the two parts is a shouldered portion having squared surfaces 84, arranged to receive the washer 85, the latter being provided with a squared opening.

In Fig. 15 is shown in perspective the sleeve 86, which is slipped over the spindle and engages with the right-hand end of the valve.

In Fig. 17 is shown the construction of the universal joint in the valve-stem. 87 represents the slotted end of the outer portion of the spindle, 88 the slotted end of the inner portion, and 89 the connecting-piece, which is provided with projections 90, that enter the slots in the parts of the valve-stem. These projections are provided with pin-receiving openings. The object in putting this universal coupling between the parts of the valve-stem is to permit the inner end or abutment of the governor to rotate about its own center of gravity without causing undue strain on the stem.

Referring to Figs. 21 to 25, inclusive, 17 represents one of the struts or compression members of the centrifugal speed-governor. It is flat on the inside and curved on the outer and provided on its opposite ends with knife-edges 91, which are of special formation, as shown in Fig. 24. The outer surface of the strut being curved conforms to the shape of the spring, while the inner surface being flat, with a small groove therein, affords the necessary clearance between it and the adjacent strut and the valve-actuator. In order that the knife-edge may have sufficient strength, it is necessary to have a somewhat blunt edge. For example, we have found it to be desirable to have the side walls or faces of the ends extend at an angle of ninety degrees to each other, with a slightly-rounded edge. If the entire walls or faces extended at an angle of ninety degrees, it would necessitate making a very shallow seat in the block or support, which is objectionable. We overcome this objection by giving to the walls which are somewhat remote from the knife-edge a different inclination—for example, sixty degrees. In other words, by our improved construction we are able to save considerable space at a point where it is of vital importance. In Fig. 25 is shown a seat which we have found to be adapted for a knife-edge of the character described. We find it advantageous to make the walls of the seat with two walls or faces which are formed at different angles. The portion of the walls adjacent to the seat can with advantage be one hundred and twenty degrees apart, which will permit the necessary angular movement of the knife-edge. The second portion of the walls form an angle of ninety degrees with respect to each other, which being remote from the knife-edge will not interfere with the action of the latter. For the purpose of illustration we have mentioned certain definite angles which we have found to be satisfactory in our improved construction; but we do not wish to be understood as limiting ourselves thereto.

In Figs. 26 to 28, inclusive, is shown our improved spring-carrying nuts or heads, the object of which is to reduce the internal friction due to relative movement between the nut and the spring, which has heretofore been an objection to construction of this kind. As ordinarily constructed the thread of these nuts runs down to a thin knife-edge, and we have found by test that when the spring is contracted and extended some portion of a turn will pass back and forth over the thin edge of the thread and in so doing will create an excessive internal friction. We overcome this objection by cutting away one end of the screw-thread. In other words, we cause the thread to end abruptly instead of extending out to a thin knife-edge and cut away the surface at 106 to keep it out of engagement with the spring. 15 represents a nut which is adapted to encircle a coil-spring, and 95 represents a thread formed thereon. At 96 the thin wall between the threads is cut away abruptly instead of tapering to a thin point, so as to eliminate the friction between the spring and the nut as the tension on the spring varies. In order to prevent the nut from turning independently of the spring, a set-screw 97 is provided, which is so positioned that when seated it engages two turns of the spring. Figs. 27 and 28 show nuts intended to engage with the inside of the spring. 16 represents a nut which is provided with a peripheral thread 98, which is cut away abruptly at 99 and the body at 106, so that the last turn or part of a turn of the coil-spring can move toward and away from the nut in an axial plane without passing back and forth over a thin portion of the thread or the body, and thereby creating undue friction. The right-hand end of the nut is provided with a receptacle 100 to receive the sphere or ball on the end of the valve-stem, and the opposite end is provided with seats 101 for the knife-edges, which are constructed in accordance with Fig. 25. Rotating the nuts in a direction to cause them to move in or out of the spring will change the scale of the spring by changing the active number of turns.

In Figs. 29 and 30 is shown a key and key-seat which we have found to be very satisfactory for governor constructions of this kind wherein space is limited and it is desired to employ self-retaining keys. 14 represents the key which has a cylindrical enlargement 102 on its lower side and a straight-sided portion 103 on its upper side. The shaft or support in which the key is mounted is drilled, as indicated at 104, and is afterward slotted, as at 105. When once the key is mounted in place, there is no danger of its moving radially, and it can be readily fitted, so as to prevent longitudinal movement.

By varying the weights on the arms 22 the position of the center of gravity of the mass as a whole can be changed. Adding proportional weights to the arms will cause the center of gravity to be moved outwardly. Decreasing the weights proportionally will cause it to move inwardly. Changing one of the weights 27 with respect to the other will change the moment-arm of the mass about the main knife-edge 24. For example, adding weight to the long arm or arms adjacent to the wheels or, what is the equivalent, decreasing the mass of the short arm increases the moment-arm about the main knife-edge. On the other hand, decreasing the mass on the long arm or increasing the weight on the short arm decreases the moment-arm about the main knife-edge. Changing the position of the ring 13 will change the tension on the main spring, and changing the position of one or both of the nuts on the spring will change the scale of the latter.

From the foregoing it will be seen that any desired relation of the parts can be obtained with a very simple adjustment, and this without removing the governor from the machine. It is of the utmost importance in high-speed work to have governors which are capable of adjustment in the manner specified. With low-speed governors this is not so essential, and the ordinary governor, arranged for a low-speed machine, will not operate in a successful manner when used for a high-speed machine. In other words, the low-speed governor is not interchangeable with the high-speed governor, and the requirements of the latter are far more severe than those of the former.

By arranging the knife-edges, spring, and other parts in the manner specified the internal friction is reduced to such a small amount that it can be disregarded. In other words, a curve illustrating the action of the governor will show that it assumes the same position for a given speed under conditions of increasing or decreasing speed—that is to say, the "lag" is eliminated.

The governor may be mounted directly on the shaft to be governed or upon a shaft which derives its movement from said shaft.

In accordance with the provisions of the patent statutes we have described the principle of operation of our invention, together with the apparatus which we now consider to represent the best embodiment thereof; but we desire to have it understood that the apparatus is only illustrative and that the invention can be carried out by other means.

What we claim as new, and desire to secure by Letters Patent of the United States, is—

1. In a shaft-governor, the combination of centrifugally-acting weights, a spring opposing the weights, an abutment movable in response to the resultant forces due to the combined action of the weights and spring, a means for varying the moment-arms of the weights, a means for changing the tension on the spring, and a means for changing the scale of the spring.

2. In a shaft-governor, the combination of centrifugally-acting weights, knife-edges for supporting the weights, a tension-spring opposing the weights, a movable abutment to which one end of the spring is attached, a nut secured to the spring, which acts as an anchor and as an adjusting means for changing its scale, and an actuator which extends from the abutment through the spring and nut.

3. In a shaft-governor, the combination of centrifugally-acting weight-arms, knife-edges for supporting the weight-arms, means for changing the moment-arm of the weights about the knife-edges, a tension-spring opposing the weight, a movable abutment, a means for adjusting the tension of the spring, means for adjusting the scale of the spring, and compression members or struts which extend through the spring and engage the weight-arms.

4. In a shaft-governor, the combination of a tubular support which is mounted on a shaft, a ring mounted on the support, means for adjusting the ring axially on the support, centrifugally-acting weight-arms carried by the support, a tension-spring located within the support, a movable abutment engaging the spring, and compression members or struts which engage the weight-arms and the abutment.

5. In a shaft-governor, the combination of a shaft, a support which is mounted thereon, a ring which surrounds the support and is carried thereby, a tension-spring located within the support, a nut for supporting one end of the spring and changing its scale, which is mounted on the support, a movable abutment which also forms a nut to which the opposite end of the spring is attached, seats formed in the abutment, weight-arms carried by the supports, and compression members which engage the seats and the weight-arms.

6. In a shaft-governor, the combination of a support, weight-arms carried thereby, a spring opposing the weights, means for transmitting motion from the weights to the spring, which are provided with knife-edges, frames or blocks which are detachably secured to the arms and are provided with knife-edges for supporting the weights, and seats for the knife-edges on said means.

7. In a shaft-governor, the combination of a support having seats thereon, weight-carrying arms comprising plates and weights attached thereto, frames or blocks which unite the plates each of which is provided with a knife-edge at its outer end and a seat at its inner end, measured from the axis of the support, a tension-spring which is anchored to the support at one end, a movable abutment for the opposite end of the spring, and compression members which engage the abutment and enter the seats on the inner ends of the frames or blocks.

8. In a shaft-governor, the combination of a threaded shaft, a threaded support mounted thereon, a wheel-hub situated adjacent to the support, which is provided with an external screw-thread, a ring which surrounds the support, an adjusting-nut mounted on the screw-threaded hub for engagement with the ring, a second adjusting-nut mounted on the support, which also engages the ring, weight-carrying arms carried by the ring, and a tension-spring located within the support for opposing the movements of the arms.

9. In combination, a rotating support, centrifugally-acting weight-arms carried thereby, and a device for loading or opposing the action of the weights, in combination with a valve, and an actuator which passes through the valve and at one end is acted upon by the resultant force due to the weights and said device, and at the other end is attached to the valve-stem.

10. A governing mechanism comprising a rotating support, centrifugally-acting weight-arms carried thereby, and a movable abutment which opposes the action of the weights, in combination with a valve, a hollow stem therefor which acts as a guide, and an actuator which extends through the valve and stem and is acted upon by the abutment at one end and is attached to the valve-stem at the other.

11. A governing mechanism comprising a rotating support, centrifugally-acting weight-arms carried thereby, and a movable abutment which opposes the action of the weights, in combination with a valve, a hollow stem therefor which acts as a guide, an actuator which extends through the valve and stem and is acted upon by the abutment at one end, and a means for uniting the valve-stem and the actuator, which contains a bearing for the latter.

12. A governing mechanism comprising a rotating support, centrifugally-acting weights, and a movable abutment for opposing the weights, in combination with a valve having a hollow stem, an actuator for the valve connected to the abutment, which extends through the valve, a head which is attached to the stem and the actuator, a bearing for the actuator, carried by the head, and a chamber containing lubricant for the bearing, which is formed in the head.

13. A governing mechanism comprising a rotary support, centrifugally-acting weights, and a movable abutment for opposing the weights, in combination with a valve having a hollow stem, an actuator for the valve connected to the abutment, which extends through the valve, a head which is attached to the stem and the actuator, a bearing for the actuator, carried by the head, and a cap for the bearing, which is in line with the actuator and is removable from the opposite side thereof.

14. A governing mechanism comprising a rotary support, centrifugally-acting weights, and a movable abutment for opposing the weights, in combination with a valve having a hollow stem, an actuator for the valve, which rotates with the weights and is moved longitudinally by the resultant force of the weights and opposing abutment, a head which is attached to the valve-stem, in which the actuator is free to rotate and which moves longitudinally with the actuator, and means for preventing the head from rotating.

15. A governing mechanism comprising a rotary support, centrifugally-acting weights, and a spring-pressed abutment for opposing the weights, a piston-valve, a hollow stem therefor, a head attached to the outer end of the stem, an actuator which extends through the spring and valves and enters the head, and universal bearings for the ends of the actuator, which permit the spring-pressed abutment to rotate about its own center of rotation without straining the valve.

16. In a governing mechanism, the combination of a support, weights carried thereby, a spring-pressed abutment which opposes their action, a valve, and an actuating device which is attached to the valve and the abutment and includes universal joints at the points of attachment therewith.

17. A governing mechanism comprising a rotary support, centrifugally-acting weights, and a movable abutment for opposing the weights, in combination with a reciprocating valve, a rotary actuator therefor, a head for connecting the valve and actuator, and a casing which incloses the head and has a chamber for supplying lubricant to the head.

18. A governing mechanism comprising a rotary support, centrifugally-acting weights, and a movable abutment for opposing the weights, in combination with a reciprocating valve, a rotary actuator therefor, a head for connecting the valve and actuator, a casing which incloses the head and has a chamber for supplying lubricant to the head, and an opening between the chamber and the interior of the casing for equalizing the pressures.

19. A governing mechanism comprising a rotary support, centrifugally-acting weights, and a movable abutment for opposing the weights which constitutes the main governor, in combination with an emergency-governor mounted on the rotary support and acting independently of the main governor, and a valve which is tripped by the emergency-governor.

20. A governing mechanism comprising a rotary support, centrifugally-acting weights, and a movable abutment for opposing the weights, in combination with an emergency-governor mounted on the same support with the speed-governor, a counterbalance for the emergency-governor, a valve, a latch which normally holds the valve open, and a spring which closes the valve when released by the latch.

21. In a governing mechanism, the combination of a support, a weight-arm carried thereby, an emergency-valve, a latch normally holding the valve open, which is tripped by the weight-arm, and a spring which engages the latch after being struck by the weight-arm and prevents the latch from holding the valve open.

22. In a governing mechanism, the combination of a support, a weight-arm, a spindle for the arm, which is carried by the support, a knife-edge between the arm and spindle, and a stop on the active end of the arm, which limits the movement thereof and holds the knife-edge in its seat.

23. In a governing mechanism, the combination of a support, a weight-arm, a spindle therefor, a knife-edge between the spindle and arm formed with concave side walls, and a seat for the knife-edge, provided with convex side walls.

24. In a governing mechanism, the combination of a support, a weight-arm carried thereby, a seat formed thereon, a spindle for the arm, a collar on the spindle for limiting the movement of the arm on the spindle, a knife-edge on the spindle, which engages the seat, and a spring for opposing the movements of the arm.

25. In a governing mechanism, the combination of a support, a weight-arm carried thereby, a two-part spindle about which the arm is movable, a spring which connects the parts of the spindle, and a knife-edge between the spindle and arm, which is surrounded by the arm.

26. In a governing mechanism, the combination of a support, a weight-arm carried thereby, a spindle for the arm, having a knife-edge with concave walls, and a seat for the knife-edge, formed on the arm and provided with convex walls.

27. In a governing mechanism, the combination of a support, a pair of rings carried thereby, a two-part spindle, one part being carried by one ring and the other part by the second ring, and a weight-arm mounted on the spindle.

28. In a governor, the combination of a support, a centrifugally-acting weight, and a means opposing the weight, which includes a member having a double-tapered knife-edge.

29. In a governor, the combination of a support, a centrifugally-acting weight, and a means opposing the weight, which includes a knife-edge, the walls of which have a double bevel, and a seat for the knife-edge, the walls of which are also formed with a double bevel.

30. In a governor, the combination of a support, a centrifugally-acting weight, a spring for opposing the weight, and an anchor for the spring, which is screw-threaded to receive the turns thereof, the end of the thread being cut away abruptly to prevent frictional engagement with the spring as the latter extends and contracts.

31. In a governor, the combination of a support, a centrifugally-acting weight, a spring for opposing the weight, and anchors for opposite ends of the springs, one located inside of the spring and the other outside, each anchor being screw-threaded to receive the end of the spring, with the end of the thread on the side adjacent to the center of the spring cut away abruptly to give freedom of movement to the turns of the spring between the anchors.

32. In a governor, the combination of a support, an arm carrying a centrifugally-acting weight, a knife-edge for the weight, a piece containing a seat which is slightly longer than the knife-edge, and means formed integral with the piece for limiting the longitudinal movement of the knife-edge.

33. In a governor, the combination of a support, a piece carried thereby, and a feather or key for preventing the piece from rotating independently of the support, the said feather or key comprising a cylindrical body portion which is located in one of the parts, and a projection formed thereon which is smaller in cross-section than the body portion and enters the other part.

34. In a governor, the combination of a rotating element, a valve arranged in line with the axis thereof, a speed-responsive device connected with the element and located between it and the valve, and a connection for moving the valve which extends from the speed-responsive device to a point located on the side of the valve opposite to that of the said device.

35. In a governor, the combination of a rotating element, a valve arranged in line with the axis thereof, a speed-responsive device connected with the element and located between it and the valve, a connection for moving the valve which extends from the speed-responsive device to a point located on the side of the valve opposite to that of the said device, and a universal joint between the said connection and the valve.

36. In a governor, the combination of a rotating element, a valve arranged in line with the axis thereof, a speed-responsive device connected with the element and located between it and the valve, and a connecting means between the valve and the speed-responsive device which rotates with the latter and includes a universal and slip joint at the point of connection with the valve.

37. In a governing mechanism for elastic-fluid turbines, the combination of a gravity-closing emergency-valve, an inclosure therefor, means located within the inclosure for holding the valve in raised or open position, and a centrifugally-acting emergency device arranged to release said means when the speed becomes excessive.

38. In a governor, the combination of a rotating element, independent centrifugally-acting speed-responsive devices, a common support carried by the said element for supporting the speed-responsive devices, and regulating and shut-off valves arranged to be operated by the speed-responsive devices.

39. In a governor, the combination of a rotating element, independent centrifugally-acting speed-responsive devices, a common support therefor, and a connection between the rotating element and the support by which the latter can be removed with the speed-responsive devices intact.

40. In a governor, the combination of a rotating element, a structure removably secured thereto, a speed-responsive device for actuating a regulator, and a second speed-responsive device for actuating a shut-off mechanism, both of said speed-responsive devices being carried by the said structure and removable therewith.

41. In a governor, the combination of a shaft, a hollow cylindrical support secured on the shaft to rotate therewith, a spring disposed within the support and fixedly attached at its outer end thereto, a frame arranged around the support, centrifugally-acting weights on the support, a connection between the weights and the inner or movable end of the spring, and means for adjusting the frame axially of the support for varying the tension of the spring.

42. In a governor, the combination of a shaft, a hollow support on the shaft which rotates therewith, a spring arranged in the support and attached at one end thereto, a ring arranged adjacent the support, centrifugally-acting weights on the ring, a connection for transmitting motion from the weights to the spring, and means for adjusting the ring on the support to transmit motion through the weights and the said connection to vary the tension of the spring.

43. In a governor, the combination of a shaft, a hollow support secured on the shaft to rotate therewith, an extension-spring arranged within the support and anchored at its outer end thereon, a movable abutment to which the inner end of the spring is attached, a frame surrounding the support, centrifugally-acting weights carried by the frame, struts arranged within the spring and connecting the weights with the movable abutment, and means for securing the frame to and moving it along the support for adjusting the tension of the spring.

In witness whereof we have hereunto set our hands this 5th day of March, 1904.

JOHN G. CALLAN.
FREDERIC R. C. BOYD.

Witnesses:
DUGALD McK. McKILLOP,
WILLIAM G. FISHER.